(12) United States Patent
Rhew et al.

(10) Patent No.: US 10,047,857 B2
(45) Date of Patent: Aug. 14, 2018

(54) AUTOMATIC TRANSMISSION ASSEMBLY FOR PREVENTING ERRONEOUS OPERATION

(71) Applicant: GM GLOBAL TECHNOLOGY OPERATIONS LLC, Detroit, MI (US)

(72) Inventors: Choong Hee Rhew, Gyeonggi-do (KR); Jae Hong Park, Seoul (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/107,010

(22) PCT Filed: Dec. 23, 2014

(86) PCT No.: PCT/KR2014/012694
§ 371 (c)(1),
(2) Date: Jun. 21, 2016

(87) PCT Pub. No.: WO2015/099396
PCT Pub. Date: Jul. 2, 2015

(65) Prior Publication Data
US 2017/0030461 A1    Feb. 2, 2017

(30) Foreign Application Priority Data

Dec. 23, 2013  (KR) .................... 10-2013-0161735

(51) Int. Cl.
*G05G 1/08*    (2006.01)
*F16H 61/24*    (2006.01)
(Continued)

(52) U.S. Cl.
CPC ............ *F16H 61/24* (2013.01); *F16H 59/10* (2013.01); *F16H 59/105* (2013.01); *F16H 61/22* (2013.01);
(Continued)

(58) Field of Classification Search
CPC ........ F16H 61/24; F16H 59/10; F16H 59/105; F16H 61/22; F16H 63/38; F16H 2059/026
See application file for complete search history.

(56) References Cited

U.S. PATENT DOCUMENTS 5,379,872 A * 1/1995 Dorr ..................... F16H 59/10
                                                192/220.4
5,598,740 A * 2/1997 Itoh ....................... F16H 59/10
                                                 74/473.23
(Continued)

FOREIGN PATENT DOCUMENTS

JP    05-077658 U    10/1993
JP    09-123787 A     5/1997
(Continued)

OTHER PUBLICATIONS

State Intellectual Property Office(SIPO), First Office Action dated Mar. 24, 2017 in foreign corresponding Chinese Patent Application No. 2014800700401, total 6 pages with English translation.
(Continued)

*Primary Examiner* — Vicky A Johnson
(74) *Attorney, Agent, or Firm* — Masuvalley & Partners

(57) ABSTRACT

The present invention relates to an automatic transmission assembly that prevents an erroneous operation. The automatic transmission assembly includes a housing including a detent part; a gear shift lever including a guide part and a detent bar that is movable up and down in the guide part. The detent bar is movable; and a stopper including a resilient part and a head on a side of the resilient part, the head being disposed to be located on a side of the detent part, where the stopper is pivotable in the front, back, left, and right directions, the detent bar, when moving rearward, makes contact with the outer front surface of the head to confine the movement of the gear shift lever, and the stopper pivots in the left and right directions to move irrespective of the head when the detent bar moves from the rearmost side to the front side.

5 Claims, 6 Drawing Sheets

(51) Int. Cl.
*F16H 63/38* (2006.01)
*F16H 59/10* (2006.01)
*F16H 61/22* (2006.01)
*F16H 59/02* (2006.01)

(52) U.S. Cl.
CPC ....... *F16H 63/38* (2013.01); *F16H 2059/026* (2013.01)

(56) References Cited

U.S. PATENT DOCUMENTS

| | | | |
|---|---|---|---|
| 5,797,295 | A | 8/1998 | Kataumi et al. |
| 6,332,524 | B1 * | 12/2001 | Shin ........................ F16H 59/10 192/220 |
| 6,622,583 | B2 | 9/2003 | Wang |
| 2004/0194567 | A1 | 10/2004 | Giefer et al. |

FOREIGN PATENT DOCUMENTS

| | | | |
|---|---|---|---|
| JP | 2005-047406 A | | 2/2005 |
| JP | 2013193600 A | * | 9/2013 |
| KR | 10-2003-0016654 A | | 3/2003 |
| KR | 10-2003-0020697 A | | 3/2003 |
| KR | 10-2005-0044101 A | | 5/2005 |

OTHER PUBLICATIONS

KIPO, Notice of Allowance dated Mar. 27, 2015 in KR Patent Application No. 10-2013-0161735.
ISA/KR, International Search Report dated Mar. 25, 2015 in International Application No. PCT/KR2014/012694, Total 4 pages with English translation.

* cited by examiner

Rearwards ←――――→ Forwards

Rearwards ←——→ Forwards

Rearwards ←——→ Forwards

Rearwards ←——————→ Forwards

Rearwards ←——————→ Forwards

AUTOMATIC TRANSMISSION ASSEMBLY FOR PREVENTING ERRONEOUS OPERATION

CROSS-REFERENCE TO RELATED APPLICATIONS

This application is a national stage entry under 35 U.S.C. § 371 of International Application No. PCT/KR2014/012694 filed on Dec. 23, 2014, and claims priority under 35 U.S.C. § 119 to Korean Patent Application No. 10-2013-0161735, filed on Dec. 23, 2013, which are hereby expressly incorporated by reference in their entirety for all purposes.

TECHNICAL FIELD

The present invention relates to an automatic transmission assembly for a vehicle, and more particularly to an assembly for an automatic transmission erroneous operation preventing assembly for preventing an erroneous operation that is generated during a rapid gear shift.

BACKGROUND ART

A straight automatic transmission apparatus generally installed in a vehicle shifts gears of the vehicle by moving a gear shift lever to the front and rear sides of the driver, and in this case, when the driver rapidly manipulates the gear shift lever without carefully viewing the gear shift knob while shifting gears from a transmission stage (generally, stages P and R) situated on the front side of stage N (neutral) to stage D (driving), the gear shift lever may be moved to stage M (low speed) via stage D in an unintended way. In particular, the unskilled drivers are apt to generate erroneous operations more frequently, and the erroneous operations may cause very dangerous results such as traffic accidents according to the location or driving condition of the vehicle.

In order to solve the problem, Korean Patent Application Publication No. 2003-0020697 discloses an apparatus that includes a vehicle speed detecting sensor to interrupt an operation of a gear shift lever when a gear shift that does not agree with a detected speed and a vehicle state is made, to prevent an erroneous operation, but manufacturing costs increase due to a high-priced electronic device and an erroneous operation or an operation discontinuation may be caused by the electronic equipment.

Accordingly, Korean Patent Application Publication No. 2003-0016654 discloses an apparatus for preventing an erroneous operation of a transmission by using a mechanical device, but due to a large number of components installed in the mechanical device, the problems such as a gap between components, generation of noise, and damage to the components still exist, and the problems such as a mis-assembly and the complexity of the manufacturing process are not solved.

(Patent Document 1) KR 2003-0020697 A
(Patent Document 2) KR 2003-0016654 A

DISCLOSURE

Technical Problem

The present invention has been made in an effort to solve the above-mentioned problems, and provides an automatic transmission erroneous operation preventing assembly that prevents an erroneous operation, reduces manufacturing costs, and simplifies a manufacturing process with a simple structure.

Technical Solution

According to an embodiment of the present invention, there is provided an automatic transmission assembly including: a housing including a detent part; a gear shift lever including a guide part and a detent bar that is movable upwards and downwards within the guide part, the detent bar being movable within a detent part; and a stopper including a resilient part and a head on one side of the resilient part, the head being situated one one side of the detent part, wherein the stopper is pivotally movable forwards, rearwards, leftwards, and rightwards, and the detent bar confines a movement of the gear shift lever while making contact with a front surface of an outside of the head when the detent bar is moved rearwards and the stopper is pivoted leftwards and rightwards when the detent bar is moved from the rearmost side to the front side such that the stopper is movable irrespective of the head.

It is preferable that the stopper further includes: first and second stopping portions situated on the front and rear sides of the head, respectively; and a hollow portion that is a space formed between the first and second stopping portions of the head, and an upper side of the head is opened.

It is preferable that the detent bar enters and exits from the hollow portion while moving between the inside and outside of the hollow portion.

It is preferable that the first stopping portion is rounded on a side close to the hollow portion, and the detent bar is rounded at an end close to the stopper.

It is preferable that the stopper further includes a neck part that connects the resilient part and the head, and the automatic transmission assembly further includes an interval maintaining part extending from the neck part towards the housing.

It is preferable that the automatic transmission assembly further includes stopping step protruding from one side of the detent part.

Advantageous Effects

As described above, according to the automatic transmission assembly according to the present invention, a remarkable effect of reducing manufacturing costs can be achieved as compared with an apparatus that electronically controls an erroneous operation, by installing an erroneous operation preventing stopper having a simple structure, and a gap between components, noise due to the gap, and damage to the components, caused by a plurality of components can be prevented by integrally forming the stopper of a resilient plastic material.

DESCRIPTION OF THE INVENTION

Figure 5A:
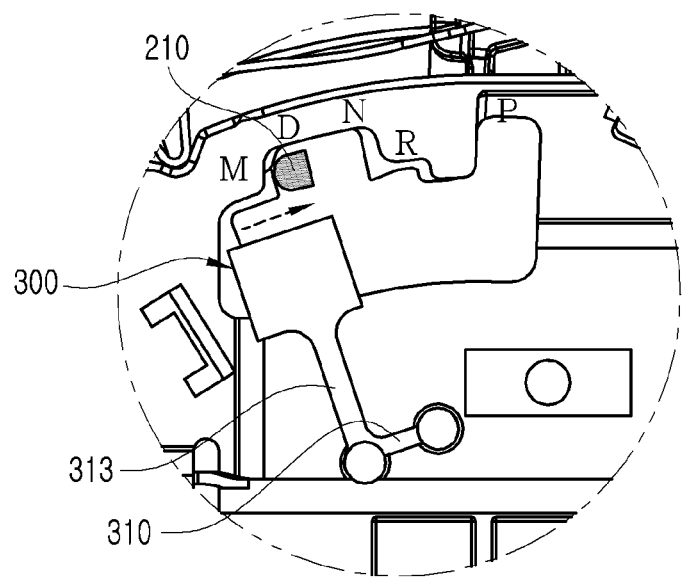
Figure 5B:
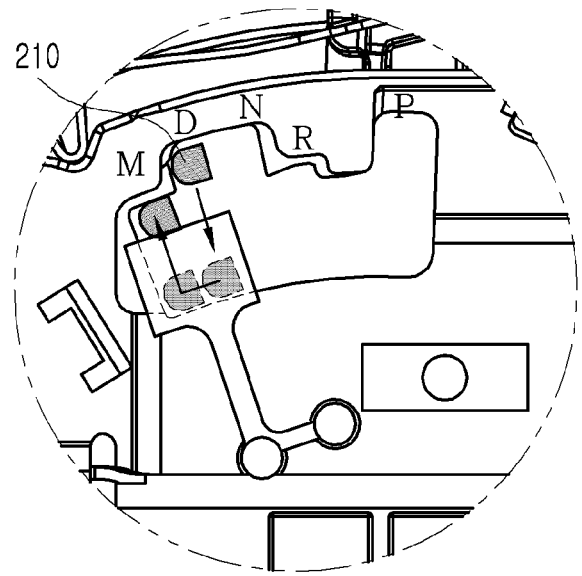
Figure 6A:
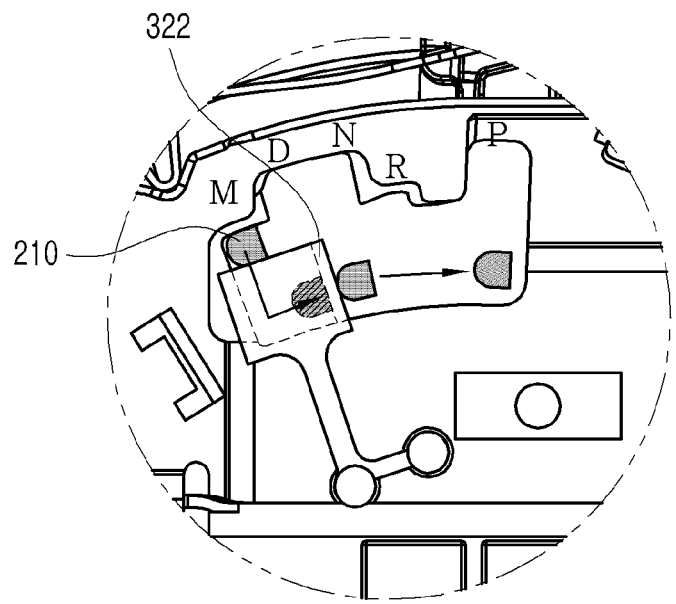
Figure 6B:
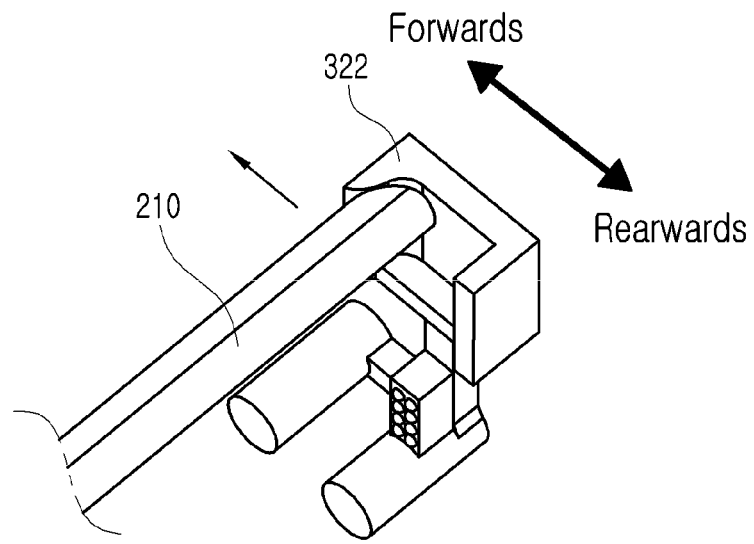
Figure 6C:
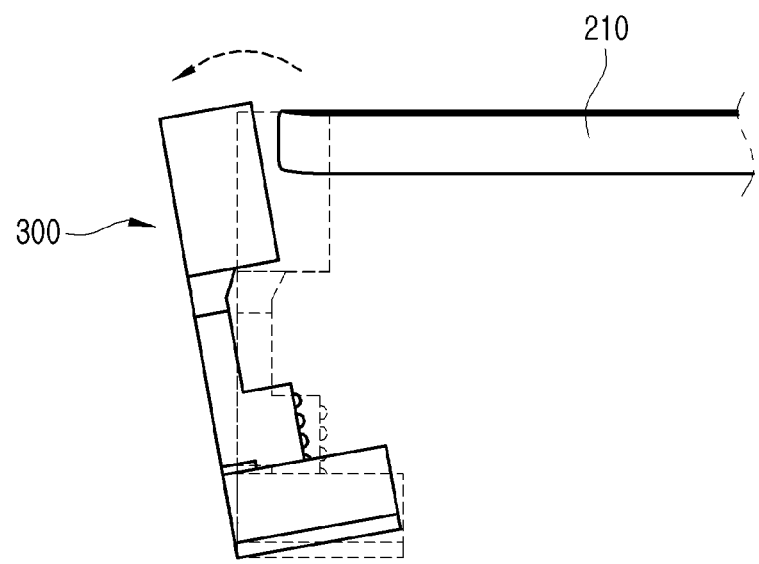

FIGS. 3 to 6A are enlarged views illustrating the detent part 110 of the automatic transmission assembly according to the present invention to describe operations of the detent bar 210 and the stopper 300; and FIGS. 6B and 6C are perspective views of the stopper 300 and the detent bar 210 that are elements of the automatic transmission assembly according to the present invention to describe the operations of the stopper 300 and the detent bar 210.

BEST MODE

The elements constituting the automatic transmission assembly according to the present invention may be integrally used or separately used as occasion demands. Further, some element may be omitted according to the usage of the automatic transmission assembly.

A preferred embodiment of the automatic transmission assembly according to the present invention will described with reference to the accompanying drawings. It should be noted that the drawings are not to precise scale and may be exaggerated in thickness of lines or size of components for descriptive convenience and clarity. In addition, terms used herein are defined by taking functions of the present invention into account and can be changed according to user or operator custom or intention. Therefore, definition of the terms should be made according to the overall disclosure set forth herein.

Description of Structure of Assembly for Preventing Erroneous Operation of Automatic Transmission Hereinafter, the automatic transmission assembly according to an embodiment of the present invention will be described with reference to FIGS. 1 to 3.

The automatic transmission assembly according to the embodiment of the present invention includes a housing 100, a gear shift lever 200, and a stopper 300.

The housing 100 has a hollow box shape, and includes a detent part 110 and a stopping step 120.

The detent part 110 is formed by opening some portions of the left and right side surfaces of the housing 100, and it is preferable that an upper portion of the detent part 110 is stepped.

The stopping step 120 may protrude while being spaced apart from the detent part 110 rearwards by a predetermined distance.

The gear shift lever 200 has a bar shape such that a lower end thereof is inserted into the housing 100 to be pivoted forwards and rearwards, and includes a detent bar 210 and a gear shift button 230.

The detent bar 210 has a bar shape and is disposed at a lower portion of the gear shift lever 200 to be moved upwards and downwards in a guide part 220 that passes through the gear shift lever 200 in the lengthwise direction thereof.

That is, the detent bar 210 is disposed to cross the transmission lever 200, and it is preferable that an end of the detent bar 210, at which a stopper 300, which will be described later, is situated, is rounded toward the front side.

The gear shift button 230 is situated on one side of an upper portion of the gear shift lever 200, and the detent bar 210 is moved downwards if the gear shift button 230 is pushed and the detent bar 210 is moved upwards if the pushed state is released.

Hereinafter, the stopper 300 that is one of the main elements of the automatic transmission assembly according to the present invention will be described in detail.

Figure 1:
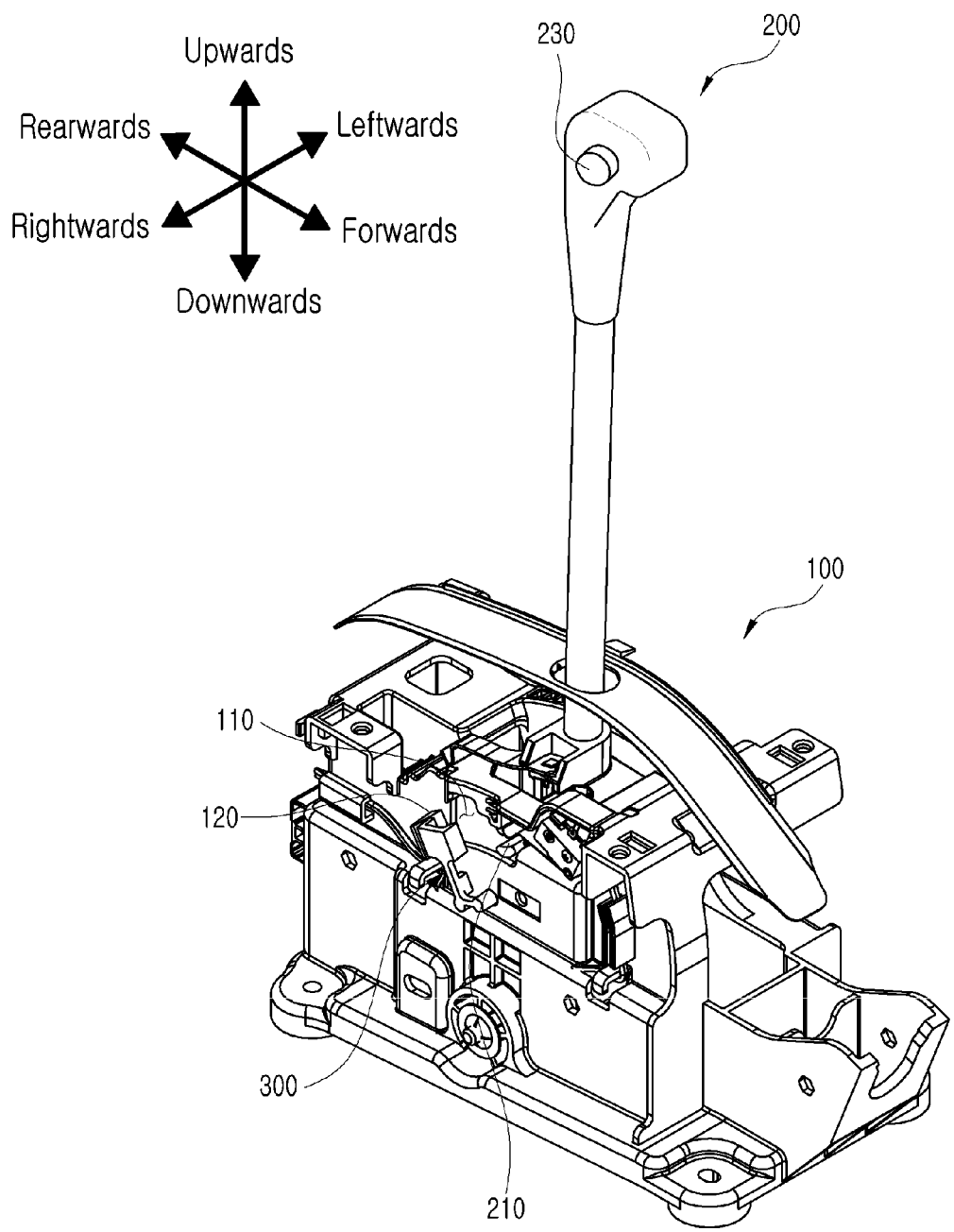
FIG. 1 is a perspective view illustrating an automatic transmission assembly according to the present invention in its entirety.
Figure 3:
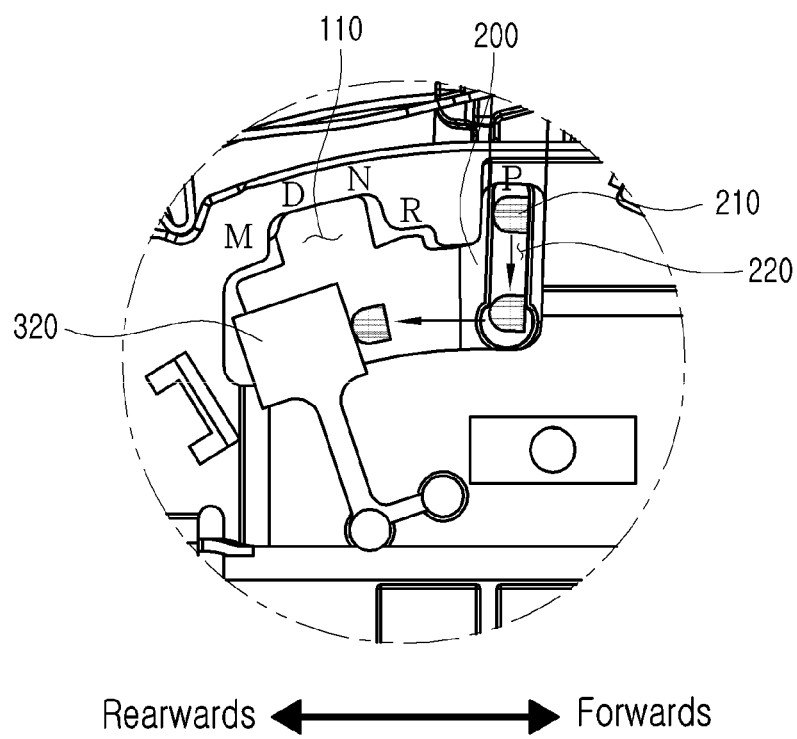

As illustrated in FIGS. 1 and 3, the stopper 300 is spaced apart from the detent part 110 on one of the left and right side surfaces of the housing 100 to be connected to the housing 100 by a first connector 311 and a second connector 312, and includes a resilient part 310, a head 320, and an interval maintaining part 330.

Further, it is preferable that the stopper 300 is integrally formed of a plastic material having a resilient force, but respective parts of the stopper 300 will be described for convenience of description in the following.

Opposite sides of the resilient part 310 are connected to the first connector 311 and the second connector 312, respectively. That is, the resilient part 310 is situated between the first connector 311 and the second connector 312, and it is preferable that the resilient part 310 is has an elongated shape to show a maximum resilient force while maintaining the strength of the plastic material.

The head 320 is connected to the detent part 110 by a neck part 313 extending from the first connector 311 connected to one side of the resilient part 310 to cover an opened portion of the detent part 110, and may be pivoted about the first connector 311 forwards, rearwards, leftwards, and rightwards by applying the resilient forces of the resilient part 310 and the neck part 313.

Accordingly, because the detent bar 210 makes contact with the head 320 such that a rearward movement thereof is confined when the detent bar 210 is moved rearwards within the detent part 110, an erroneous operation is prevented while a manipulation lever 200 is moved rearwards.

Figure 2:
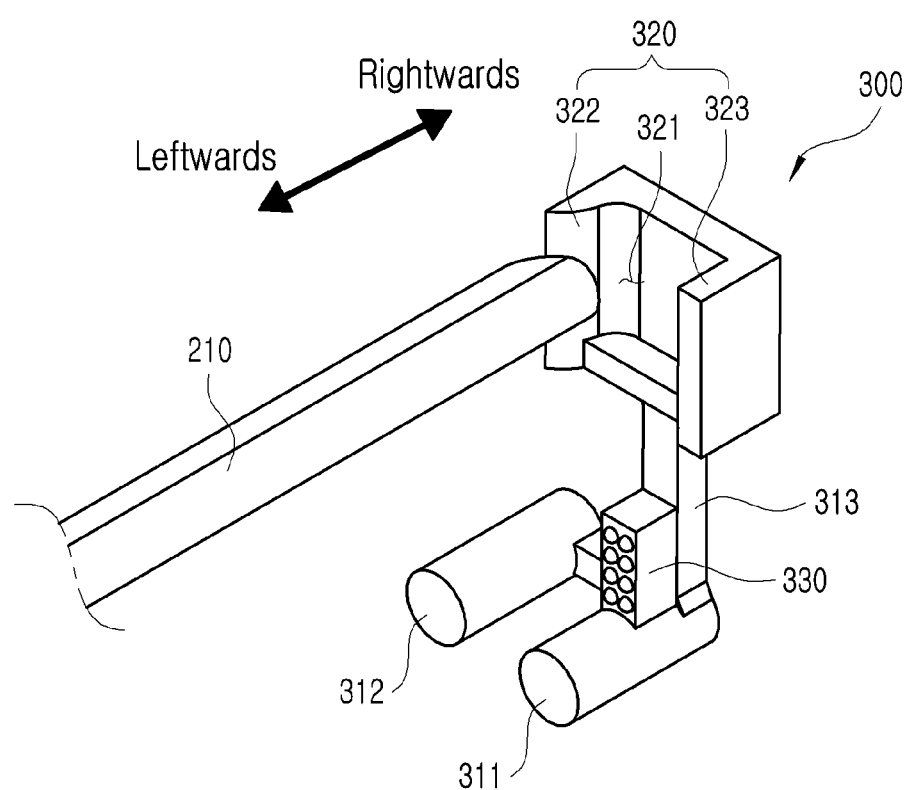
FIG. 2 is a perspective view illustrating a stopper 300 and a detent bar 210 that are elements of the automatic transmission assembly according to the present invention.

Further, as illustrated in FIG. 2, a hollow portion 321 is formed in the interior of the head 320 and a first stopping portion 322 and a second stopping portion 323 are formed on the front and rear sides of the hollow portion, respectively.

The hollow portion 321 is a space that is formed in the interior of the head 320, and the first stopping portion 322 is formed on the front side of the hollow portion 321 and the second stopping portion 323 is formed on the rear side of the hollow portion 321 such that they block the front and rear sides of the hollow portion 321, respectively, and it is preferable that a side of the hollow portion 321 that is close to the first stopping portion 322 is rounded.

That is, the head 320 has a space in the interior thereof, and a side of the head 320 close to the housing 100 and an upper side of the head 320 are opened such that the head 320 has a laid U-shape when viewed from the top, and the detent bar 210 makes contact with an outer surface of the first stopping portion 322 when the the detent bar 210 is moved rearwards, and accordingly, the head 320 retreats such that an outer surface of the second stopping portion 323 makes contact with the stopping step 120.

Further, the detent bar 210 overpasses the first stopping portion 322 to be movable upwards, downwards, forwards, and rearwards in the hollow portion 321, which will be described below.

The interval maintaining part 330 is situated at the neck part 313 and protrudes from the neck part 313 towards the housing 100, and prevents friction between the stopper 300 and the housing 100 by maintaining the interval between the stopper 300 and the housing 100 at a predetermined distance such that the head 320 is pivoted forwards and rearwards.

Description of Operational Process of Automatic Transmission Assembly

Hereinafter, the operational process of the automatic transmission assembly according to the present invention will be described with reference to FIGS. 3 to 6C.

The terms regarding the locations of the transmission, which will be used in the following description will be denoted by gear shift stages that are used in general automatic transmissions, and it is noted that although P, R, N, D, and M stages are illustrated in FIGS. 3 to 6A in sequence from the front side and stage P represents "parking gear", stage R represents "reverse gear", stage N represents "neutral gear", stage D represents "driving gear", and stage M represents "low-speed driving gear", stage M may be replaced by stage L and the numbers such as stage 2 and stage 1.

Further, in stage M, the detent bar 210 is situated on the rearmost side of the forward/rearward movable displacement.

Further, because it has been described that the detent bar 210 is moved upwards and downwards along the guide part 220 formed at a lower portion of the gear shift lever 200, which is a known technology, the gear shift lever 200 and the guide part 220 are not be illustrated but the detent bar 210 and the stopper 300 are mainly illustrated in the drawings except for FIG. 3 for convenience of description and understanding of the present invention, and an operation of the detent bar 210 is indicted by a solid line arrow, a movement of the stopper 300 is indicted by a broken line arrow, and the operations of the detent bar 210 and the stopper 300 will be mainly described in the following description.

First, referring to FIG. 3, if the gear shift lever 200 is pulled rearwards after the detent bar 210 is moved downwards by pushing the gear shift button 230 while the gear shift lever 200 is situated at stage P, the detent bar 210 is moved rearwards to make contact with the first stopping portion 322 that is a front portion of the head 320 of the stopper 300.

Figure 4:
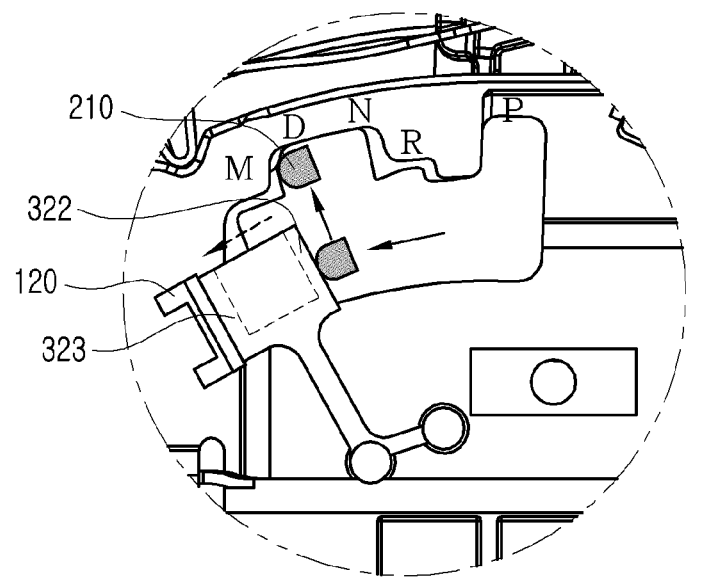

Next, referring to FIG. 4, if the detent bar 210 is further moved while making contact with the first stopping portion 322 and reaches stage D, the head 320 is pivoted rearwards and the second stopping portion 323 on the rear side of the head 320 is stopped by the stopping step 120 formed in the housing 100 so that the detent bar 210 is prevented from being further moved rearwards and an intended erroneous operation to stage M is prevented when stage P is instantaneously converted to stage D.

Next, referring to FIG. 5A, after an erroneous operation is prevented, the detent bar 210 is situated at stage D, and the stopper 300 returns to its original position due to the resiliency of the resilient part 310 and the neck part 313.

If the gear is to be shifted to stage M in this state, the detent bar 210 is moved downwards as illustrated in FIG. 5B, and then, because the detent bar 210 may enter the interior of the open-topped hollow portion 321 from the interior of the head 320 and may be moved rearwards, the gear may be shifted from stage D to stage M.

Next, in order that the gear may be shifted from stage M to gear stages (stages N, R, and P) situated on the front side except for stage D, the detent bar 210 should be moved forwards after being moved downwards, and illustrated in the hatched part of FIG. 6A and FIG. 6B, the detent bar 210 may be stopped inside the first stopping portion 322 when it is moved forwards.

Then, the stopper 300 may be damaged if an excessive pressure is applied to move the detent bar 210 as the stopper 300 is not smoothly moved forwards and the driver should apply a considerable load even though the stopper 300 is moved, which causes an inconvenience or a stopping feeling during an operation of the assembly, and as illustrated, the detent bar 210 may pass through the first stopping portion 322 by rounding an inside of the first stopping portion 322 and an end of the detent bar 210 and as illustrated in FIG. 6C, the stopper 300 is pivoted to an opposite side of the housing 100 due to resiliency so that a smoother movement effect can be achieved.

As described above, according to the automatic transmission assembly of the present invention, a manufacturing cost problem of the conventional electronic erroneous operation preventing apparatus can be solved by integrally forming the stopper 300 of one plastic material, the manufacturing costs and the weight of assembly can be remarkably reduced by solving a problem caused as the conventional mechanical erroneous operation preventing apparatus is assembled and installed with a larger number of components, and a gap between components of the conventional erroneous operation preventing apparatus and noise due to the gap can be solved by excluding a plurality of components.

Although the preferred embodiments of the present invention have been described, it will be understood by those skilled in the art that the present invention can be variously corrected and modified without departing from the spirit and scope of the present invention claimed in the claims.

The invention claimed is:

1. An automatic transmission assembly comprising:
  a housing comprising a detent part;
  a gear shift lever comprising a guide part and a detent bar that is movable upwards and downwards within the guide part, the detent bar being movable within the detent part; and
  a stopper comprising a resilient part and a head on one side of the resilient part, the head being situated one side of the detent part,
  wherein the stopper is pivotally movable forwards, rearwards, leftwards, and rightwards, and the detent bar confines a movement of the gear shift lever while making contact with a front surface of an outside of the head when the detent bar is moved rearwards and the stopper is pivoted leftwards and rightwards when the detent bar is moved from the rearmost side to the front side such that the detent bar is movable irrespective of the head;
  wherein the stopper further comprises:
  first and second stopping portions situated on the front and rear sides of the head, respectively; and
  a hollow portion that is a space formed between the first and second stopping portions of the head, and
  wherein an upper side of the head is opened.

2. The automatic transmission assembly of claim 1, wherein the detent bar enters and exits from the hollow portion while moving between the inside and outside of the hollow portion.

3. The automatic transmission assembly of claim 2, wherein the first stopping portion is rounded on a side close to the hollow portion, and the detent bar is rounded at an end close to the stopper.

4. The automatic transmission assembly of claim 3, wherein the stopper further comprises a neck part that connects the resilient part and the head, and the automatic transmission assembly further comprises an interval maintaining part extending from the neck part towards the housing.

5. The automatic transmission assembly of claim 1, further comprising:
  a stopping step protruding from one side of the detent part.

* * * * *